United States Patent
Nishizono et al.

(10) Patent No.: US 10,353,366 B2
(45) Date of Patent: Jul. 16, 2019

(54) CUSTOMIZATION METHOD OF MOTOR CONTROL DEVICE AND MOTOR CONTROL DEVICE

(71) Applicant: Panasonic Intellectual Property Management Co., Ltd., Osaka (JP)

(72) Inventors: Masaru Nishizono, Osaka (JP); Ken'ichi Suzuki, Osaka (JP); Yusuke Imada, Osaka (JP); Yuya Sakamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/545,716

(22) PCT Filed: Dec. 15, 2016

(86) PCT No.: PCT/JP2016/005134
§ 371 (c)(1),
(2) Date: Jul. 23, 2017

(87) PCT Pub. No.: WO2017/110061
PCT Pub. Date: Jun. 29, 2017

(65) Prior Publication Data
US 2018/0032047 A1 Feb. 1, 2018

(30) Foreign Application Priority Data

Dec. 22, 2015 (JP) .................................. 2015-250135

(51) Int. Cl.
*H02P 29/20* (2016.01)
*G05B 19/042* (2006.01)
(Continued)

(52) U.S. Cl.
CPC .......... *G05B 19/0426* (2013.01); *H02P 29/00* (2013.01); *H02P 29/10* (2016.02); *H02P 29/20* (2016.02)

(58) Field of Classification Search
CPC ............................ G05B 19/0426; H02P 29/20
(Continued)

(56) References Cited

U.S. PATENT DOCUMENTS 4,366,420 A * 12/1982 Omae ...................... H02P 7/298
318/139
4,753,309 A * 6/1988 Marumoto ........... B62D 5/0463
180/446
(Continued)

FOREIGN PATENT DOCUMENTS

CN 103490700 A 1/2014
CN 105122155 12/2015
(Continued)

OTHER PUBLICATIONS

Machine translation of JP2008176609A.*
(Continued)

*Primary Examiner* — Kawing Chan
(74) *Attorney, Agent, or Firm* — McDermott Will & Emery LLP

(57) ABSTRACT

In a customization method of a motor control device, a customization module for executing a modifying operation of a specific function in a customizing element is formed. A customization module group is configured by a set of customization modules. The user can form a user module for executing an operation related to the specific function in the customizing element. A buffer memory accessible from both the customization module and the user module is provided. The customization module is configured to execute the
(Continued)

operation related to the specific function based on data received from the user module via the buffer memory.

12 Claims, 5 Drawing Sheets

(51) Int. Cl.
  *H02P 29/10* (2016.01)
  *H02P 29/00* (2016.01)
(58) Field of Classification Search
  USPC ........................................... 318/568.1
  See application file for complete search history.

(56) References Cited

U.S. PATENT DOCUMENTS

| | | | |
|---|---|---|---|
| 5,684,374 A | 11/1997 | Chaffee | |
| 5,949,663 A * | 9/1999 | Endo | H02M 7/003 363/37 |
| 6,335,870 B1 * | 1/2002 | Sakurai | H02M 5/44 363/34 |
| 6,555,978 B1 * | 4/2003 | Castellon | H02H 7/0851 318/266 |
| 7,421,384 B2 * | 9/2008 | Yamada | G06F 11/261 702/117 |
| 7,904,212 B2 * | 3/2011 | Mensler | G01H 17/00 381/86 |
| 8,203,293 B2 * | 6/2012 | Ohgushi | H02P 21/16 318/400.02 |
| 9,509,496 B2 * | 11/2016 | Kawamura | B60R 25/24 |
| 2005/0222726 A1 * | 10/2005 | Furui | B60R 16/0231 701/36 |
| 2007/0242398 A1 * | 10/2007 | Ogawa | B62D 5/04 361/33 |
| 2008/0138169 A1 * | 6/2008 | Jackson | F16B 5/0642 411/450 |
| 2009/0212928 A1 * | 8/2009 | Aijaz | H04L 63/08 340/426.1 |
| 2009/0237016 A1 * | 9/2009 | Iwashita | H02J 7/345 318/400.3 |
| 2011/0022751 A1 | 1/2011 | Hrachovec et al. | |
| 2011/0215901 A1 * | 9/2011 | Van Wiemeersch | B60R 25/04 340/5.54 |
| 2012/0157079 A1 * | 6/2012 | Metivier | G07C 9/00182 455/420 |
| 2016/0036369 A1 | 2/2016 | Ando | |

FOREIGN PATENT DOCUMENTS

| | | |
|---|---|---|
| EP | 3051368 | 8/2016 |
| JP | 2005-234639 | 9/2005 |
| JP | 2008176609 A * | 7/2008 |
| JP | 2012-244856 | 12/2012 |
| JP | 6037032 B | 11/2016 |
| WO | 2015/045549 | 4/2015 |

OTHER PUBLICATIONS

International Search Report of PCT application No. PCT/JP2016/005134 dated Mar. 21, 2017.
The Extended European Search Report dated Mar. 26, 2018 for the related European Patent Application No. 16877966.8.
English Translation of Chinese Search Report dated May 11, 2018 for the related Chinese Patent Application No. 201680012954.1.

* cited by examiner

CUSTOMIZATION METHOD OF MOTOR CONTROL DEVICE AND MOTOR CONTROL DEVICE

This application is a U.S. national stage application of the PCT International Application No. PCT/JP2016/005134 filed on Dec. 15, 2016, which claims the benefit of foreign priority of Japanese patent application No. 2015-250135 filed on Dec. 22, 2015, the contents all of which are incorporated herein by reference.

TECHNICAL FIELD

The present invention relates to customization methods of motor control devices typically for controlling motor positions and speeds, and motor control devices having a customization function. More particularly, the present invention relates to customization of industrial-use motor control devices.

DESCRIPTION OF THE RELATED ART

Industrial-use motor control devices as mentioned above are also called servo amplifiers, and they are, in general, operated based on feedback control. In other words, a motor control device detects the motor operating position and speed, and controls its behavior, such as motor position and speed, in a way such that the behavior follows position commands or speed commands input from outside. This type of control is normally executed based on system software installed in the motor control device.

However, when a load connected to the motor is changed, for example, control parameters in the system software may not be always optimum for this new load. To optimize the parameters, the user needs to make a request for modification to a device manufacturer every time. Since these industrial-use motor control devices have relatively severe restrictions, the user cannot easily make a modification when a function of system software needs to be partially modified.

Under the circumstances, a customization method that allows the user to make a simple modification by himself/herself to a part of system software has been proposed (e.g., PTL1). This conventional customization method includes a user function selectable parameter for enabling a user function defined by the user, instead of processing based on the system software, in units of function of system software functionality. Based on determination of whether or not the user function is enabled, the user function is executed, instead of system software processing, when the user function is enabled.

The conventional method as disclosed in PTL1 enables a prompt action when system software functionality needs to be partially modified.

CITATION LIST

Patent Literature

PTL1: Japanese Patent Unexamined Publication No. 2005-234639

SUMMARY

A customization method of a motor control device of the present invention achieves customization by providing a customizing element that enables the user to make a modification to a specific function in each function unit in the motor control device for controlling a motor. The customization method of motor control device forms a customization module for executing a modifying operation to the specific function in the customizing element, and configures a customization module group by a set of customization modules. The user can form a user module for executing an operation related to the specific function in the customizing element. A buffer memory is provided to enable access from both customization module and user module. In this customization method, the customization module is configured such that the customization module executes the operation related to the specific function based on data received from the user module via the buffer memory.

A motor control device for controlling a motor of the present invention has a customization function in which multiple customizing elements that enable the user to make a modification to a specific function are provided in each function unit. The motor control device includes a CPU for executing processing according to a program, a program memory storing programs including a motor control program for controlling motor behavior, a drive circuit for receiving a motor control signal generated when the CPU executes the motor control program and generating a motor drive signal for energizing and driving the motor based on the motor control signal, a customization module memory for storing a customization module group that is a set of customization modules for executing modifying operations to specific functions in the customizing elements, a user module memory storing a user module created by the user for executing an operation related to the specific function in the customizing element, and a buffer memory accessible from the customization module and the user module. The motor control device is configured such that the customization module conducts the customization function by executing an operation based on data received from the user module via the buffer memory.

DETAILED DESCRIPTION OF THE PREFERRED EMBODIMENT

The aforementioned conventional method is configured to directly modify system software with a user function defined by the user. Accordingly, the user needs technical skills for creating a user function and knowledge of system software. Still more, since the user function defined by the user directly affects the system software, it may risk erroneous motor operation and degrade safety. Accordingly, it becomes an extremely tough for a manufacturer to guarantee the product operation. Furthermore, a portion of system software related to a function to be modified needs to be disclosed to the user. This may lead to leakage of manufacturer's expertise.

The motor control device in an exemplary embodiment of the present invention is described below with reference to drawings.

Exemplary Embodiment

Figure 1:
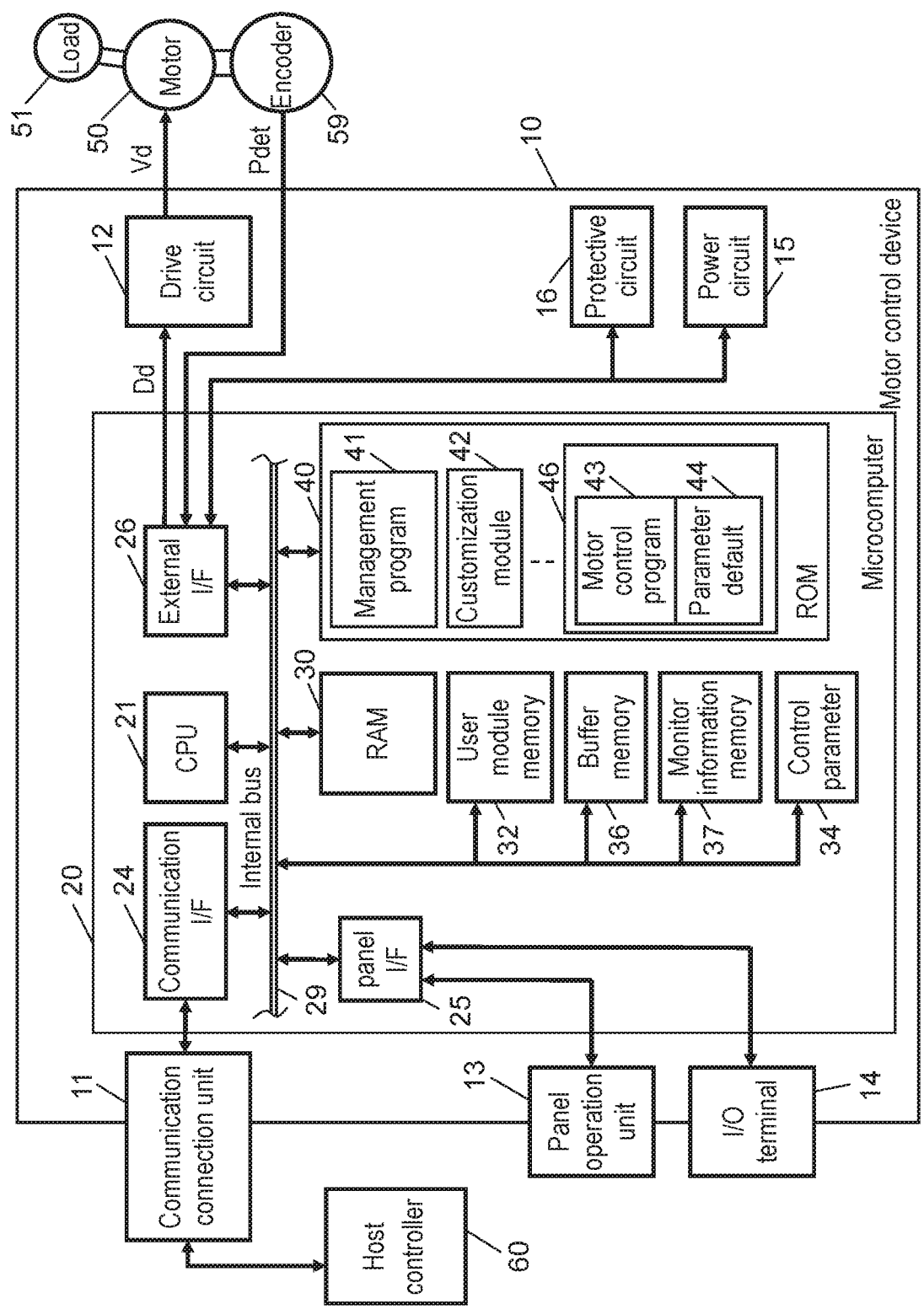
FIG. 1 is a block diagram of a motor control system including a motor control device in accordance with an exemplary embodiment of the present invention.

FIG. 1 is a block diagram of configuration of a motor control system including motor control device 10 in the exemplary embodiment of the present invention.

The motor control system, as shown in FIG. 1, includes motor 50, load 51 connected to motor 50, motor control device 10 for controlling and driving motor 50 by carrying current, encoder 59 for detecting a position of a movable part of motor 50, and host controller 60 for controlling motor control device 10 typically by an operation command. As the motor control system, an example of system configuration mainly for industrial use is given. In other words, the motor control system controls and drives motor 50, such as a servo motor, by motor control device 10 typically called a servo amplifier. In the exemplary embodiment, a motor equipped with a rotor that rotates is given as an example of a movable part of motor 50. An example of the motor equipped with this type of rotor is described below, but the present invention is also applicable to a linear motor in which a movable part moves linearly.

A brushless motor equipped with a stator having coils for three phases: U, V, and W, and a rotor disposed opposing the stator and rotatable about a rotation shaft is suitable as motor 50 as described above. Motor control device 10 drives a stator coil by carrying current to rotate the rotor in motor 50. Motor 50 rotates to rotate load 51 via the rotation shaft by the rotation of the rotor.

To rotate motor 50, encoder 59 is mounted on motor 50 as a positional sensor for detecting a rotating position of the rotor. Encoder 59 thus outputs position-detecting signal Pdet indicating a detected rotating position. Encoder 59 supplies this position-detecting signal Pdet to motor control device 10.

Also as shown in FIG. 1, motor control device 10 is connected to host controller 60 for communication. In the exemplary embodiment, host controller 60 is connected to motor control device 10 for setting a parameter and giving an operation command to motor control device 10. More specifically, as host controller 60, a personal computer is used typically for setting parameters, and PLC (Programmable Logic Controller) or motion controller is used for giving operation commands. Host controller 60 sends a range of information, including operation commands, to motor control device 10, and also receives a range of information from motor control device 10. For example, to control the rotor position of motor 50 by motor control device 10, host controller 60 notifies a command for a target position. To control the rotor speed, host controller 60 notifies a command for a target speed.

The motor control system is a system particularly for industrial use. Accordingly, host controller 60 is equipped with many software programs, including application programs for motor control, in addition to commands for motor control device 10. Host controller 60 executes various processing operations by being connected to motor control device 10. For example, host controller 60 has applications for programming user modules related to the customization function in the exemplary embodiment and for setting parameters to set characteristics and functions in motor control device 10, and other software programs for auto-tuning, monitoring of control status, data measurement, error notice, and so on.

Motor control device 10 connected to this host controller 60 has a feedback control function to operate following an operation command while detecting or estimating a motor motion position or speed. In other words, as a basic function, motor control device 10 controls the rotor motion of motor 50 in a way such that the rotor follows an operation command supplied from host controller 60 by feedback control using position-detecting signal Pdet from encoder 59.

Next is described a detailed structure of this motor control device 10 with reference to FIG. 1.

As shown in FIG. 1, motor control device 10 includes a one-chip microcomputer (hereinafter referred to as 'microcomputer') 20 with built-in CPU (Central Processing Unit) 21, communication connection unit 11, drive circuit 12, panel operation unit, I/O terminal 14, power circuit 15, and protective circuit unit 16.

Communication connection unit 11 is provided for data communication with host controller 60. Data is transmitted to and received from host controller 60. More specifically, communication connection unit 11 is a data transmission and reception circuit supporting serial communication standards, such as RS232C/485, and USB (Universal Serial Bus) standards. For transmitting operation commands, RTEX (Realtime Express) and EtherCAT communication, which have dedicated FA network communication specifications, are also often used.

Panel operation unit 13 is provided for an interface with the user using motor control device 10. The user directly inputs parameters and data to motor control device 10 or data in motor control device 10 is directly presented to the user via this panel operation unit 13. More specifically, an input function for the user is, for example, a combination of button switches, dip switch, or rotary switch. A function to present to the user is, for example, a seven-segment display. The user operates motor control device 10 via this panel operation unit 13. Practically, panel operation unit 13 is used for simple operations, and host controller 60 is used for advanced operations of motor control device 10.

I/O terminal 14 is provided for data connection with external equipment, using digital I/O and analog pulse signals. I/O terminal 14 is a terminal, such as a connector, for inputting data to motor control device 10 and outputting data from motor control device 10.

Protective circuit unit 16 is a series of protective circuits provided for securing safety of motor control device 10 and motor control system, such as protection related to power source, protection against overheat, and protection against overload.

Power circuit 15 is a power source for supplying needed power to each part of motor control device 10.

Microcomputer 20 basically controls the motor, the major function of motor control device 10. In other words, a motor control program for controlling the motor is installed in microcomputer 20. Built-in CPU 21 executes processing according to this program to control the motor rotation. To execute this control, host controller 60 supplies an operation command to microcomputer 20 via communication connection unit 11, and encoder 59 supplies position-detecting signal Pdet. Microcomputer 20 then generates motor control signal Dd to make motion of the motor based on position-detecting signal Pdet follow the operation command. More specifically, microcomputer 20 also executes operations according to other processing programs, in addition to motor control. Further details are described below.

Motor control signal Dd generated by microcomputer 20 is supplied to drive circuit 12. Drive circuit 12 is equipped with a so-called inverter, and motor drive signal Vd according to supplied motor control signal Dd is generated, using this inverter. This motor drive signal Vd is applied to a coil of motor 50 to drive motor 50 by carrying current, and thus the rotor in the motor rotates.

Next, a detailed configuration of microcomputer 20 is described with reference to FIG. 1.

As shown in FIG. 1, microcomputer 20 includes CPU 21, communication interface 24, panel interface 25, external interface 26, RAM 30, ROM 40, user module memory 32, control parameter memory 34, buffer memory 36, monitor information memory 37, and internal bus 29 for connection of digital signals, such as data and addresses, of these components inside microcomputer 20.

Communication interface (hereinafter referred to as 'communication I/F') 24 transmits and receives data to and from communication connection unit 11. In other words, communication I/F 24 transmits data received by communication connection unit 11 to CPU 21 via internal bus 29, receives data generated by CPU 21 via internal bus 29, and transmits it to communication connection unit 11.

Panel interface (hereinafter referred to as 'Panel I/F') 25 transmits and receives data to and from panel operation unit 13 and I/O terminal 14. In other words, panel I/F 25 transmits data input to panel operation unit 13 to CPU 21 via internal bus 29, receives data generated by CPU 21 via internal bus 29, and transmits it to panel operation unit 13. In the same way, panel I/F 25 transmits data input to the input terminal of I/O terminal 14 to CPU 21 via internal bus 29, receives data generated by CPU 21 via internal bus 29, and transmits it to the output terminal of I/O terminal 14.

External interface (hereinafter referred to as 'external I/F') 26 inputs and outputs a range of signals including control signal with each circuit in microcomputer 20 and motor control device 10. For example, external I/F 26 outputs PWM (Pulse Width Modulation) signal, which is a signal whose pulse width is modulated according to drive amount, to drive circuit 12 as motor control signal Dd. In this case, a digital signal according to the drive amount is supplied from CPU 21 to external interface 26 via internal bus 29. External I/F 26 converts this digital signal to PWM signal and outputs it. For example, external I/F 26 takes in position-detecting signal Pdet from encoder 59. In this case, external I/F 26 converts position-detecting signal Pdet supplied to a digital signal indicating position. External I/F 26 then transfers this digital signal to CPU 21 via internal bus 29. External I/F 26 is also connected to protective circuit unit 16 and power circuit 15 to input and output control signals, and detection and measurement signals.

ROM (Read Only Memory) 40 is a nonvolatile memory only for reading, and mainly stores embedded programs to be executed by CPU 21 for processing and control in the device. In the exemplary embodiment, ROM 40 functions as a program memory for storing these programs. For example, ROM 40 stores major programs, including management programs for managing a range of processing and control, and motor control programs for controlling the motor.

In ROM 40 in FIG. 1, management programs are stored in management program area 41, customization module groups, which will be detailed later, in customization module area 42, and motor control modules in motor control module area 46. Still more, in motor control module area 46, motor control programs are stored in motor control program area 43, and default values of control parameters to which the motor control programs refer to are stored in parameter default value area 44. ROM 40 is not limited to non-writable ROM. It may also be a rewritable flash memory and other rewritable mediums, such as writing data to EEPROM and the use of external memory. The key function of ROM 40 here is that the user cannot easily access and rewrite stored programs due to the characteristic of programs stored.

CPU 21 is a microprocessor, and reads programs stored in ROM 40 via internal bus 29 in a sequential order, and operates according to programs read to execute operation based on the programs.

RAM (Random Access Memory) 30 is a rewritable memory accessible at random. RAM 30 is used as a work memory of CPU 21 for executing processing.

The exemplary embodiment further includes user module memory 32, control parameter memory 34, buffer memory 36, and monitor information memory 37. These memories are also rewritable random-access memories, same as RAM 30. To simplify description, these memories are described for each function in the exemplary embodiment. However, predetermined areas, such as a user module memory area, control parameter memory area, buffer memory area, and monitor information memory area; may also be further provided in RAM 30.

Control parameter memory 34 is a memory storing control parameters referred by the motor control program. CPU 21 executes processing based on control parameters stored in parameter default value area 44 only at startup, according to the motor control program. Then, CPU 21 executes processing based on control parameters stored in this control parameter memory 34. In other words, motor control device 10 is configured such that control parameters stored in control parameter memory 34 can be changed as required as processing takes place.

As described above, the motor control program is a program for controlling the motor operation basically according to feedback control. The control parameters here are variables set for identifying a specific feature or function in the motor control, including feedback control. More specifically, the control parameters are, for example, settings of gains and filters in a feedback control loop. Gains include proportional gains, integral gains, differential gains, and feed-forward gains relative to control of position, speed, and torque. Filter settings include frequency, amplitude, and attenuation. Other than these parameters, control parameters include designation of switchover of characteristics accompanying control or processing and switchover of position, speed and torque control. CPU 21 controls the motor based on these control parameters stored in control parameter memory 34. For example, CPU 21 executes an operation based on initial value 'g0' of control gain G stored in control parameter memory 34. Then, when the control gain value in control parameter memory 34 is changed to 'g1,' CPU 21 executes the operation based on changed value 'g1' of control gain G.

Monitor information memory 37 is a memory integrally storing setting states of each unit in motor control device 10 as data. In other words, CPU 21 monitors information on settings and measurements by communication connection unit 11, drive circuit 12, panel operation unit 13, I/O terminal 14, power circuit 15, and protective circuit unit 16, in addition to the above control parameters. These pieces of information are recorded in monitor information memory 37 as monitor information. Examples of the monitor information are data related to a communication system and communication rate in use in communication connection unit 11 and transmission and reception data, setting values of input and output display on panel operation unit 13, and terminal values of I/O terminal 14.

User module memory 32 is a memory for storing user programs in units of module, when a group of programs created by the user is set as a module. User module memory 32 functions as a user module storage section. In other words, the user can create a specific required function as a user module in the motor control system in the exemplary embodiment. This user module is stored in user module memory 32. More specifically, the user module is a program for allowing the user to execute a specific function. An operation of a function that the user demands is executed by making CPU 21 read and execute a program in this module.

An example of the user module is a function specified for changing certain control gain G. This function can be stored as a user module in the exemplary embodiment. In other words, the user can create a user module for changing control gain G, and stores it in user module memory 32 for operation. Accordingly, the exemplary embodiment is configured to allow the user to form a user module for executing an operation related to a specific function.

Buffer memory 36 is a read-write memory that can be used by reading and writing the user module stored in user module memory 32. Each module is a program, and to be exact, CPU 21 executes processing, such as reading from and writing to the memory, according to the module program. However, to simplify description by avoiding lengthy phrases, an expression as if the module is executing processing, such as reading and writing the memory by module, is used in description below.

Microcomputer 20 is configured as described above.

A customization module group, i.e., multiple customization modules, is stored in customization module area 42 of ROM 40, as described above.

This customization module area 42 functions as a customization module storage section. The customization module is a module configured with a set of programs corresponding to specific functions, same as the user module. However, although the user module is changeable by the user, the customization module is a set of programs installed in advance in ROM 40, which is read only. The user thus cannot freely modify the customization module. Still more, the customization module is configured with programs including reference to buffer memory 36. Multiple customization modules of this type are grouped in each function unit to configure a customization module group. The exemplary embodiment is configured to achieve customization of motor control device 10 by modifying settings of specific functions in each part of motor control device 10 by using these customization modules.

Examples of functions of the customization module are a change or modification of control parameters, a modification of settings for input and output display on panel operation unit 13, display of data output from buffer memory 36 on panel operation unit 13, and sending of data to communication connection unit 11. Specific examples of the customization module are gain settings, such as a speed proportional gain, speed integral gain, and speed feed forward gain in control parameters. In case of this gain setting, the customization module refers to a value set in buffer memory 36 to set a corresponding gain value to control parameter memory 34. In this way, the exemplary embodiment forms the customization module that executes a modifying operation of a specific function in a customizing element, and configures the customization module group by a set of customization modules.

As described above, in the exemplary embodiment, the customization module group for executing modifying operations of specific functions is formed in advance, and the user can create user modules. The exemplary embodiment is configured to allow the user to modify, update or change a specific function or add a specific function, by using the user module and customization module group. In other words, the exemplary embodiment uses the user module and customization module group to provide a customizing element for each function unit for the user.

Furthermore, the exemplary embodiment has buffer memory 36 into which the user module writes data and from which the customization module read this data. In other words, the exemplary embodiment allows the user to modify a function as a customizing element only via buffer memory 36.

In summary of the customization method of motor control device 10 in the exemplary embodiment, the customization module group is first configured, and the user is allowed to create a user module. Still more, buffer memory 36 accessible from both the customization module and user module is provided. The customization module executes an operation related to a specific function based on data received from the user module via buffer memory 36. More specifically, an operation of the user module is restricted such that the user module can only write data into buffer memory 36, and an operation of the customization module is restricted to processing using data in buffer memory 36 as parameters.

In the exemplary embodiment, the user can easily and quickly modify a specific function without a risk of erroneous operation or decreased safety by incorporating the customization method based on the customization function as configured above in motor control device 10.

Next is described the detailed configuration and operation for realizing the customization function in motor control device 10 in the exemplary embodiment as configured above.

Figure 2:
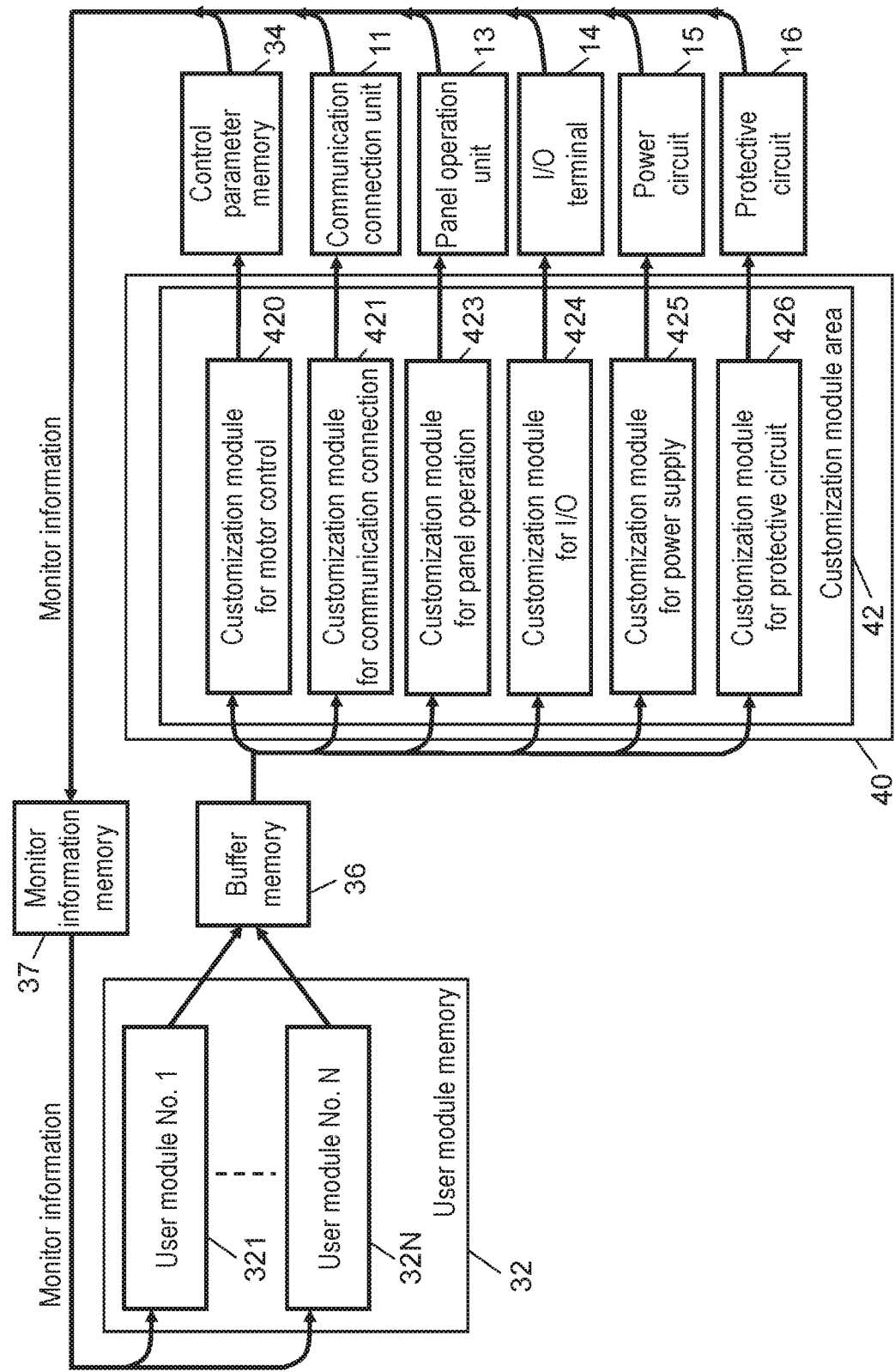
FIG. 2 is a block diagram of a customization function of the motor control device in accordance with the exemplary embodiment of the present invention.

FIG. 2 is a block diagram of a key part related to the customization function of motor control device 10 in the exemplary embodiment. In the exemplary embodiment, as described above, the customization function is achieved by the customization module group stored in customization module area 42 of ROM 40, the user module written in user module memory 32, and buffer memory 36 accessible from both the customization module and user module. To be precise, CPU 21 executes processing operations, but as noted above, each module is indicated to execute an operation also in the description below.

First, as shown in FIG. 2, the customization module group further divided into each function is stored in customization module area 42. FIG. 2 shows an example of storing the next customization modules in ROM 40. In customization module area 42, each area stores at least one module: a customization module for motor control in area 420, a customization module for communication connection in area 421, a customization module for panel operation in area 423, a customization module for I/O in area 424, a customization module for power supply in area 425, and a customization module for protective circuit in area 426.

The customization module for motor control is a module for mainly changing a set value in control parameter memory 34. A set of these modules is stored in area 420. Each module in this area corresponds to a specific function or characteristic in motor control, and a parameter for processing according to the motor control program is changed by executing the module. For example, the module corresponding to speed control is divided into the first module for speed proportional gain, the second module for speed integral gain, and the third module for speed forward gain, so as to change a set value of gain, using a desired module.

To make the description easier to understand, an example of setting each gain separately is given. However, more specifically, gains are often correlated to achieve optimum setting. In other words, for example, when the speed proportional gain is increased, the speed integral gain is decreased. Accordingly, for example, a table for multiple combinations of optimum gains may be prepared and the module may be configured to select a combination of gains in each module. For example, the first module includes settings of positional gain=100, speed proportional gain=200, speed integral gain 10, and so on, and the second module includes settings of positional gain=200, speed proportional gain=100, speed integral gain=10, and so on.

The customization module for communication connection is a module for operation related to a function of data sending and receiving by communication connection unit 11. A set of these modules is stored in area 421. By executing a module in this area, for example, an operation related to data sending and receiving by communication connection unit 11 is modified. A specific example is a change of communication system or communication speed (communication baud rate) with host controller 60.

The customization module for panel operation is a module for operation related to functions of panel operation by panel operation unit 13. A set of these modules is stored in area 423. By executing a module in this area, for example, a user input to panel operation unit 13 or the operation related to user presentation takes place. A specific example is to display data stored in an address in buffer memory 36, designated by a parameter, with a panel presentation function, or to store data input by the user at an address in buffer memory 36, designated by a parameter.

The customization module for I/O is a module for operation related to I/O data of I/O terminal 14. A set of these modules is stored in area 424. By executing a module in this area, for example, the operation related to I/O data of I/O terminal 14 takes place. A specific example is to output data stored at an address in buffer memory 36, designated by a parameter, from the data output terminal, or store data of the data input terminal at an address in buffer memory 36, designated by a parameter.

The customization module for power supply is a module for operation related to the power supply by power circuit 15. A set of these modules is stored in area 425. By executing a module in this area, for example, the operation related to power supply from power circuit 15 is changed.

The customization module for protective circuit is a module for operation related to protection by protective circuit unit 16. A set of these modules is stored in area 426. By executing a module in this area, for example, the operation related to protective function by protective circuit unit 16 is changed.

As described above, the customization module for executing a modifying operation of specific function in a customizing element is formed in the exemplary embodiment. A set of customization modules configure the customization module group. The customization module includes a range of various operations as described above, in addition to a modifying operation of specific function. Still more, since these customization modules are grouped for each specific function in the exemplary embodiment, extension via software update, for example, is also feasible. In other words, for example, the exemplary embodiment enables to take an add-on approach of making the customization function better gradually, taking into account a market trend.

Still more, information on specific function of each unit is stored in monitor information memory 37, corresponding to processing of the specific function of each unit by the customization module. In other words, data indicating a range of pieces of information, including data indicating set values and states and measurement data in communication connection unit 11, drive circuit 12, panel operation unit 13, I/O terminal 14, power circuit 15, and protective circuit unit 16 is taken in and stored in monitor information memory 37 as monitor information, in addition to values set in control parameter memory 34. Specific examples of the monitor information are a communication system in communication connection unit 11, an input value in panel operation unit 13 by an input switch, and a value displayed on 7-segment display, in addition to set values of control parameters. The customization module and corresponding function and monitor information do not always need to be a one-on-one relation.

Next, as described above, the user module for executing an operation related to specific function in the customizing element is created by the user in the exemplary embodiment. FIG. 2 shows the state that the user modules formed by the user are stored in the user module memory 32. More specifically, FIG. 2 shows an example that the first user module (user module No. 1) is stored in area 321 of user module memory 32, and Nth user module (user module No. N) is stored in area 32N.

The user module is a module configured with a group of programs created by the user. In the exemplary embodiment, commands are provided as a series of programming elements for creating these user modules. Types of commands include commands for writing into buffer memory 36 at addresses designated by parameters, in addition to commands for arithmetic operations such as addition, subtraction, multiplication, and division; commands for logical operations, such as logical OR operation, logical AND operation, and shift; commands for comparison and branch; and commands for reading data in each memory. The user can program by combining these commands. In particular, in the exemplary embodiment, the user module can obtain the setting state of each unit in motor control device 10 by using motor information memory 37. Still more, in the exemplary embodiment, a write command in the user module for a memory is limited to buffer memory 36, as shown in FIG. 2. In other words, the user module can only write into buffer memory 36.

On the other hand, compared to the user module, the customization module executes processing using at least data in buffer memory 36 as a parameter, as shown in FIG. 2. Accordingly, an operation by the customization module is restricted to parameters using data only in buffer memory 36 in the exemplary embodiment.

With the configuration described above, the customization function functions as follows, based on the customization method in the exemplary embodiment. First, a series of commands created by the user is stored in user module memory 32 to form a user program. The user module is formed by this program. The user module stored in user module memory 32 executes an operation related to a specific function according to the procedure of the commands. Then, the user module writes its operation result into buffer memory 36 as data. At the same time, the customization module related to this specific function is activated. The activated customization module refers to buffer memory 36 according to the procedure installed in advance. Then, the customization module executes a modifying operation, for example, using the data referred to. The customization function in the exemplary embodiment restricts the customization module to receive data from the user module only via buffer memory 36. Accordingly, the exemplary embodiment achieves the customization function and also suppresses a risk of erroneous operation and decreased safety in the motor operation by providing this kind of restriction.

Still more, in the customization method, the user module and customization module are completely separated by buffer memory 36. In other words, buffer memory 36 is an interface connecting the function of user module and the function of customization module, and also clearly separating both functions. By adopting the configuration of employing buffer memory 36, information related to a function to be modified is not completely disclosed to the user. Accordingly, this prevents leakage of manufacturer's expertise and also secures product operation guarantee.

Furthermore, the customization method is a method of writing results of operation in the user module only into buffer memory 36. Accordingly, the user can confirm operation results by referring to buffer memory 36. This facilitates debugging of the user module, and also achieves an effect of preventing erroneous operation.

Figure 3:
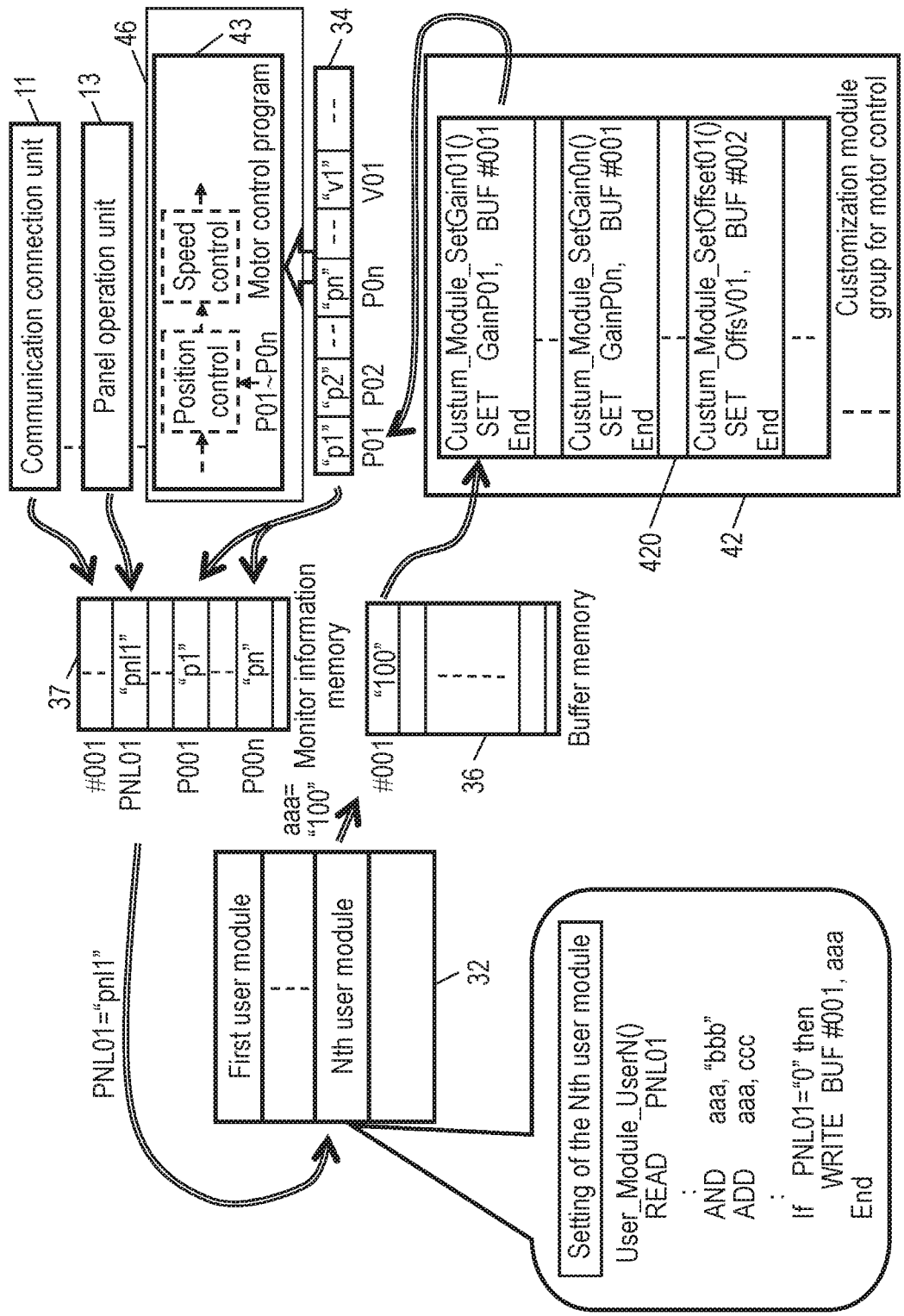
FIG. 3 is an example of operation of the customization function of the motor control device in accordance with the exemplary embodiment of the present invention.
Figure 4:
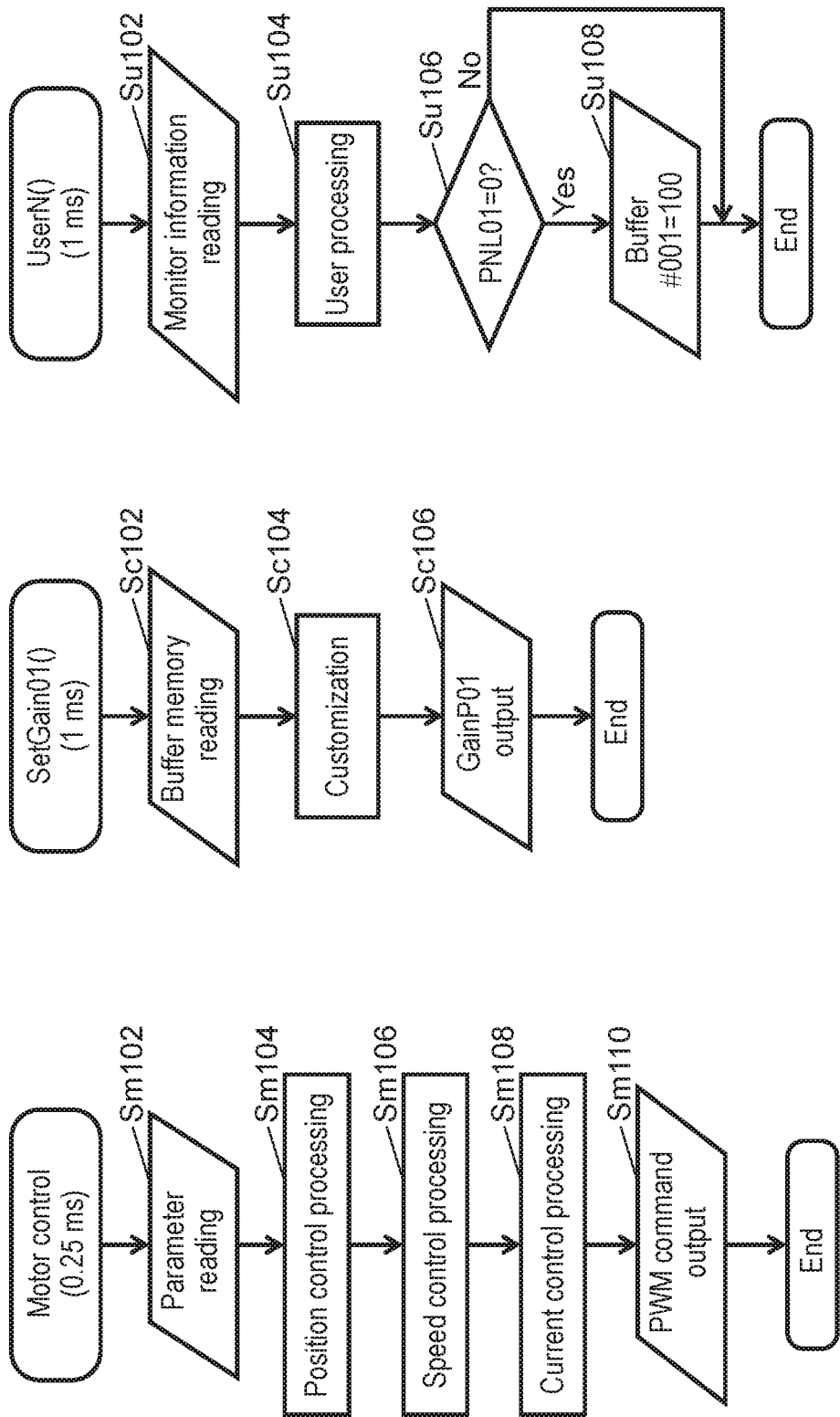
FIG. 4 is a flow chart illustrating a motor control program, which is the major processing of the motor control device, and processing in the customization module and user module for achieving the customization function in accordance with the exemplary embodiment of the present invention.

FIG. 3 illustrates an example of the operation of customization function in motor control device 10, based on the customization method in the exemplary embodiment. FIG. 4 illustrates a motor control program, which is the major processing of motor control device 10, and process flow charts of the customization module and user module for achieving the customization function. Next is described the detailed operation for implementing the customization function, taking an example of changing positional gain P01 in the position control of motor control, with reference to FIG. 3 and FIG. 4.

First, in FIG. 3, area 420 of customization module area 42 in ROM 40 stores a set of modules for modifying set values in control parameter memory 34. FIG. 3 gives an example of storing SetGain01( ) and SetGainOn( ) for setting gain, and SetOffset01( ) for setting offset as customization modules stored for each function.

Here, customization module SetGain01( ) is used for describing an example of the operation. Customization module SetGain01( ) includes a command based on a description of "SET GainP01, BUF #001" in its program. This command designates address #001 in buffer memory 36 by the description "BUF #001" and also designates address P01 for storing positional gain P01 in control parameter memory 34 by the description "GainP01." By activating customization module SetGain01( ) and executing this command, data at address #001 in buffer memory 36 will be stored at address P01 in control parameter memory 34. In other words, each processing step indicated by Set Gain01( ) in FIG. 4 is executed as next. First, buffer memory 36 is read out (Step Sc102). Next, customization specified by SetGain01( ) is executed (Step Sc104). Then, data obtained as a result of customization is stored at address P01 in control parameter memory 34 (Step Sc106), and processing of customization module SetGain01( ) is completed.

Still more, in the case of this customization module SetGain01( ), its specific function is to set positional gain P01. This customization module SetGain01( ) is combined with the user module, and used for a customizing element that can change positional gain P01. In other words, in this example, customization module SetGain01( ) is formed as one of customization functions, so as to execute a modifying operation to change the positional gain P01.

In the same way, for example, when customization module SetGainOn( ) is activated, data at address #001 in buffer memory 36 will be stored at address P0n in control parameter memory 34. When customization module SetOffset01( ) is activated, data at address #002 in buffer memory 36 is stored at address V01 in control parameter memory 34.

The customization modules in the exemplary embodiment are configured as described above.

As shown in FIG. 3, monitor information memory 37 takes in and stores information of each unit. FIG. 3 shows an example that value "pnl1" of panel input data of panel operation unit 13 is taken in and stored at address PNL01 in monitor information memory 37, value "p1" at address P01 in control parameter memory 34 at address P001 in monitor information memory 37, and value "pn" of address P0n in control parameter memory 34 at address P00n in monitor information memory 37.

Next, FIG. 3 gives an example of user module UserN( ), which is the first user module or Nth user module, stored in user module memory 32 as the user module created by the user.

An example of the operation is described next, using user module UserN( ). User module UserN( ) consists of a set of programs by combining a series of commands based on descriptions, such as [READ PNL01]; [AND aaa, "bbb"]; [ADD aaa, ccc]; [If PNL 01="0" then]; and [WRITE BUF #001, aaa]. A command description [READ PNL01] indicates a command for reading data at address PNL01 in monitor information memory 37. Description [AND aaa, "bbb"] indicates execution of an AND operation of variable aaa and value "bbb." Description [ADD aaa, ccc] indicates execution of addition ADD of variable aaa and variable ccc. Description [If PNL 01="0" then] indicates a command for conditional branch based on a value of variable PNL01. Description [WRITE BUF #001, aaa] indicates a command for writing a value of variable aaa into addresss #001 designated by parameter [BUF #001] in buffer memory 36. The exemplary embodiment provides a command for writing data into an address in buffer memory 36 by designating a parameter, in addition to arithmetic operations, logical operations, conditional branch, and commands for reading the command memory.

In this example of user module UserN( ), data at address PNL01 in monitor information memory 37 is used as desired data by these commands to execute desired processing, so as to create write data and store it in variable aaa. Then, when a condition that a value of variable PNL01 is equal to value "0" is satisfied, based on description [PNL 01="0"], a value of variable aaa is stored at address #001 in buffer memory 36 by the last command based on description [WRITE BUF #001, aaa]. FIG. 3 shows an example that value "100" of variable aaa is stored at address #001 in buffer memory 36 by user module UserN( ).

FIG. 4 shows the next steps as a flow of UserN( ) in processing the above user module UserN( ). First, monitor information is read out from monitor information memory 37 (Step Su102). Next, for example, user processing created by the user, such as operational processing using the monitor information read out, is executed (Step Su104). Then, whether or not a value of variable PNL01 is "0" is determined (Step Su106). When it is "0", value "100" is written in address #001 in buffer memory 36 (Step Su108), and processing of user module UserN( ) is completed.

Each step of user module UserN( ) is detailed above. However, for example, user module UserN( ) may also be a module to write a value of variable aaa into address #001 in buffer memory 36 as an event when value "pnl1" of panel input data of panel operation unit 13 becomes "0".

FIG. 4 also shows an example that the next steps are executed in the motor control program, which is the major processing of motor control device 10. In the motor control program shown in FIG. 4, a set value in control parameter memory 34 is read out (Step Sm102). Then, for example, position control processing (Step Sm104), speed control processing (Step Sm106), and current control processing (Step Sm108) are executed based on control parameters read out. A PWM signal according to a drive amount of motor 50 is generated by these processing operations. Then, microcomputer 20 outputs the generated PWM signal (Step Sm110).

In the configuration shown in FIG. 3 and FIG. 4 described above, the customization function operates as follows based on the customization method in the exemplary embodiment. First, a series of commands created by the user is stored in user module memory 32 to form a user program. Then, user module UserN( ) consisting of this program is formed. User module UserN( ) executes an operation related to a specific function according to the procedure of these commands. Then, user module UserN( ) writes value "100" of variable aaa, which is its operating result, into address #001 in buffer memory 36. At the same time, customization module SetGain01( ) related to the specific function is activated. Activated customization module SetGain01( ) refers to address #001 in buffer memory 36 according to the procedure installed in advance. Customization module SetGain01( ) then stores value "100" of data referred to at address P01 in control parameter memory 34. This makes value "p1" at address P01 changed to value "100" in control parameter memory 34.

Figure 5:
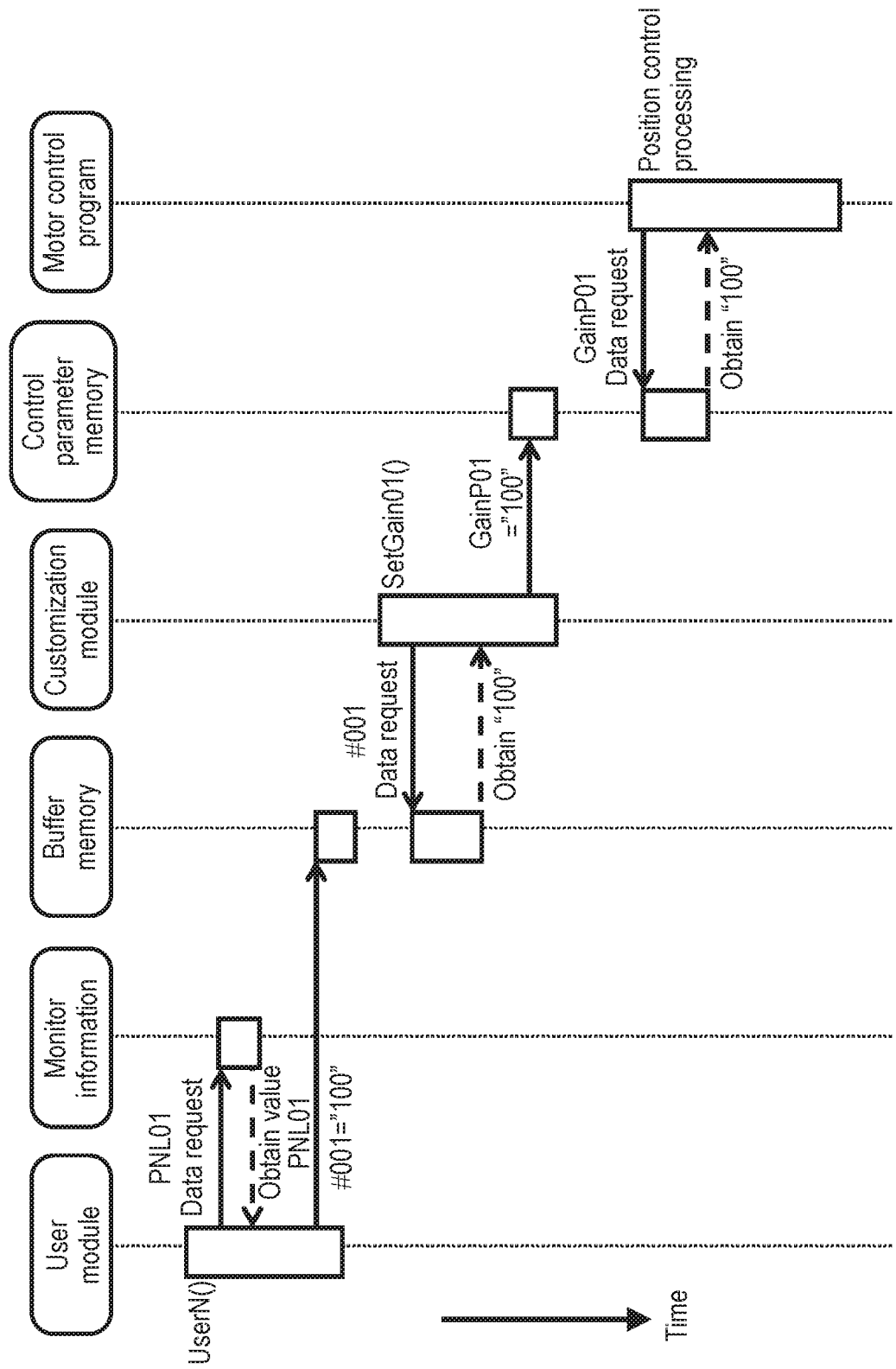
FIG. 5 is a sequence diagram illustrating procedure along the time axis when each processing is activated as a task in accordance with the exemplary embodiment of the present invention.

Next is described management of each of aforementioned modules as tasks and the operation for activating each task under task management. FIG. 5 is a sequence diagram indicating time-based processing flow on activating each step in FIG. 4 as a task. FIG. 5 shows an example of activating the motor control program as the main task at a cycle of 0.25 ms (millisecond), and also activating customization module SetGain01( ) and user module UserN( ) as sub tasks at a cycle of 1 ms (millisecond). As shown in FIG. 4 and FIG. 5, the customization module and user module are periodically activated independently and in parallel, relative to the motor control program, the main task. This enables to execute the customization function by both modules. FIG. 4 and FIG. 5 show an example of modifying a set value of positional gain P01 at an event that the value of variable PNL01 becomes value "0".

More specifically, in FIG. 3, for example, the value of address PNL01 becomes value "0" by operating panel operation unit 13. Then, as shown in operation of the user module in FIG. 5, user module UserN( ) activated as a sub task after that writes modified value "100", which is the operating result, into predetermined address #001 in buffer memory 36 as data. Then, as shown in the operation of the customization module in FIG. 5, customization module SetGain01( ) activated as a sub task in a subsequent timing refers to buffer memory 36 and obtains modified value "100". This modified value "100" is stored at predetermined address P01 in control parameter memory 34. Accordingly, the positional gain is changed to modified value "100" in the position control of motor control being executed as the main task. Here, the user module may also be configured to write segment number and set value of a specific function to be modified into buffer memory 36, and the customization module may also be configured to refer to the segment number and set value written into buffer memory 36 to modify the specific function. Still more, FIG. 4 and FIG. 5 give an example of two sub tasks in the same cycle of 1 ms. However, these tasks may have different activation cycles. Both synchronous and asynchronous activation are acceptable. Furthermore, the module may be activated at an irregular cycle or execution for only once at initialization.

As described above, the motor control device and its customization method of the present invention include the buffer memory accessible from both the customization module and the user module. The user module operation is restricted to writing data into only the buffer memory, and the customization module operation is restricted to processing based on parameters using data only in the buffer memory.

The present invention is thus a method of allowing indirect modification via the buffer memory. Accordingly, the user can easily and quickly modify specific functions in units of customization without risks of erroneous operation or decreased safety in the motor operation.

INDUSTRIAL APPLICABILITY

The motor control device and its customization method of the present invention enable customization without risks of erroneous operation or decreased safety in the motor operation. Accordingly, the present invention is effectively applicable to motor control devices, such as servo amplifiers, employed in industrial machines and industrial robots.

REFERENCE MARKS IN THE DRAWINGS

10 Motor control device
11 Communication connection unit
12 Drive circuit
13 Panel operation unit
14 I/O terminal
15 Power circuit
16 Protective circuit unit
20 Microcomputer
24 Communication interface
25 Panel interface
26 External interface
29 Internal bus
32 User module memory
34 Control parameter memory
36 Buffer memory
37 Monitor information memory
41 Management program area
42 Customization module area
43 Motor control program area
44 Parameter default value area
46 Motor control module area
50 Motor
51 Load
59 Encoder
60 Host controller

The invention claimed is:

1. A customization method of a motor control device for controlling a motor, the customization method achieving customization in the motor control device by providing a customizing element in each function unit for allowing a user to modify a specific function, the customization method comprising:

providing a customization module for executing a modifying operation of the specific function in the customizing element, and configuring a customization module group by a set of customization modules, the customization module including one or more programs that are not editable by the user;

allowing the user to create a user module for executing an operation related to the specific function in the customizing element, the user module including one or more programs created by the user; and providing a buffer memory accessible from the customization module and the user module, wherein:

the motor control device includes a CPU, the CPU reads the user module and writes the one or more programs created by user to the buffer memory, and then, the CPU refers to the one or more programs created by user stored in the buffer memory and executes the specific function stored in the customization module based on the one or more programs created by user stored in the buffer memory.

2. The customization method of the motor control device of claim 1, wherein:

the CPU executes the operation of the specific function only based on the one or more programs created by user stored in the buffer memory.

3. The customization method of the motor control device of claim 1, wherein:

the CPU executes the modifying operation according to a preinstalled procedure of the one or more programs of the customization module, and the CPU executes the operation related to the specific function according to a command procedure of the one or more programs created by the user.

4. The customization method of the motor control device of claim 1, wherein:

the data include a segment number and a set value of the specific function to be modified according to the one or more programs created by the user, and the CPU refers to the segment number and the set value written to the buffer memory to execute the modifying operation of the specific function.

5. The customization method of the motor control device of claim 1, wherein the CPU activates the user module and the customization module as mutually independent tasks.

6. A motor control device for controlling a motor, the motor control device having a customization function in which a plurality of customizing elements are provided in each function unit for allowing a user to modify a specific function, and the motor control device comprising:

a CPU for executing processing according to a program;

a program memory storing the program including a motor control program for controlling a motion of the motor;

a drive circuit for receiving a motor control signal generated by executing the motor control program by the CPU, and generating a motor drive signal for energizing and driving the motor based on the motor control signal;

a customization module memory storing a customization module group including a customization module for executing a modifying operation of a specific function in the customizing elements, the customization module including one or more programs that are not editable by the user;

a user module memory storing a user module for executing an operation related to the specific function in the customizing elements, the user module being formed by the user, the user module including one or more programs created by the user; and a buffer memory accessible from the customization module and the user module, wherein:

the CPU is configured to read the user module memory and write the user module to the buffer memory, then, refer to the user module stored in the buffer memory, and execute the specific function stored in the customization module memory based on the user module stored in the buffer memory, and the buffer memory is configured to be only written the user module and to be only read the user module by the CPU.

7. The motor control device of claim 6, wherein:

the CPU executes the specific function based on the user module.

8. The motor control device of claim 6, wherein:

the CPU executes the modifying operation according to a preinstalled procedure of the one or more programs of the customization module, and the CPU executes the operation related to the specific function according to a command procedure of the one or more programs created by the user in the user module.

9. The motor control device of claim 6, wherein:

the user module memory stores a segment number and a set value of the specific function to be modified according to the one or more programs created by the user, and the CPU refers to the segment number and the set value and the modifying operation of the specific function based on the segment number and the set value.

10. The motor control device of claim 6, wherein the CPU activates the user module and the customization module as mutually independent tasks.

11. The motor control device of claim 6, further comprising:

a control parameter memory stored a parameter based on the user module from the customization module, wherein the motor control program obtains the parameter from the control parameter memory.

12. The motor control device of claim 6, wherein the user module including a plurality of programs created by the user, wherein all the plurality of programs are sent from the user module memory to the customization module memory via the buffer memory.

* * * * *